UNITED STATES PATENT OFFICE.

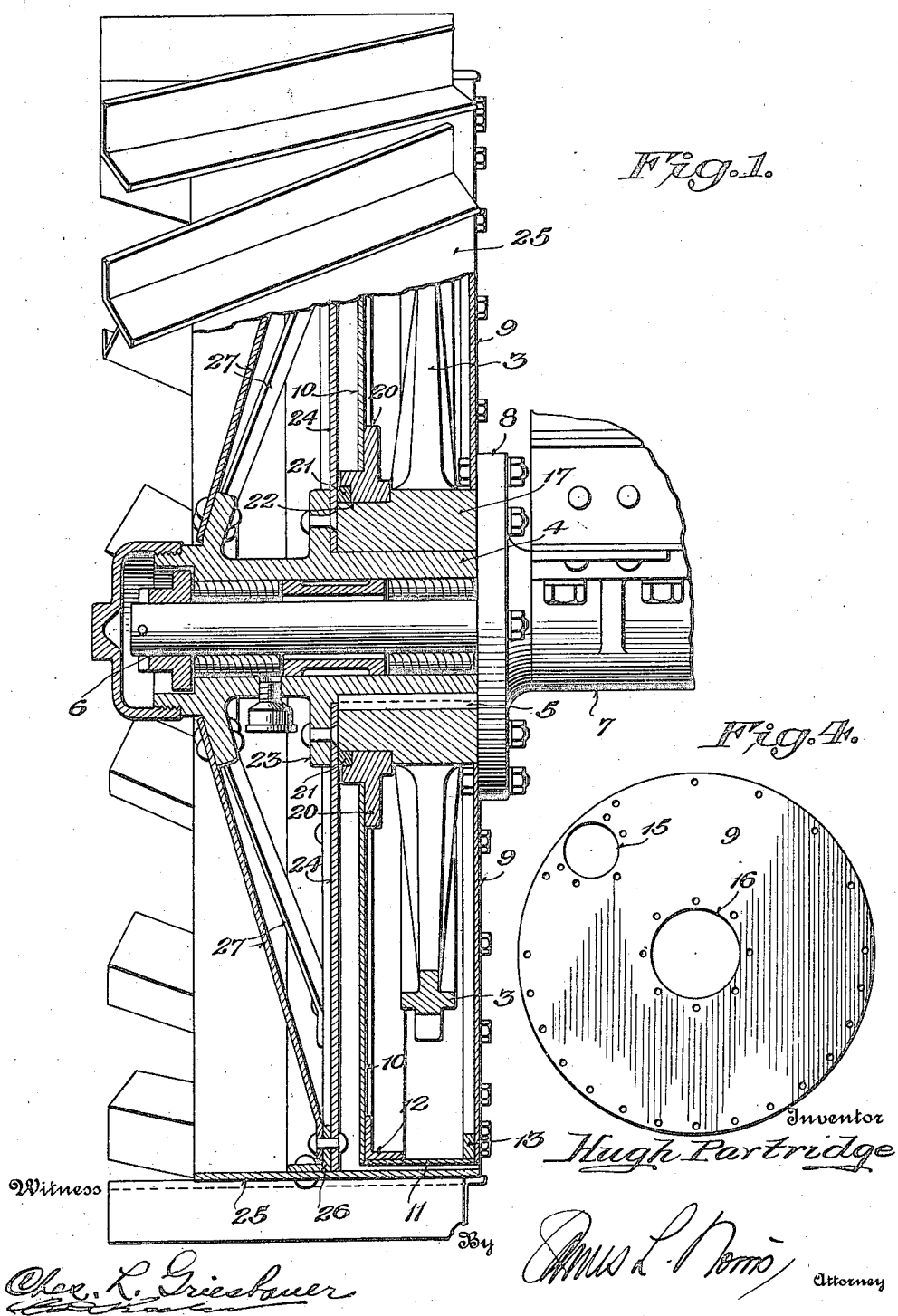

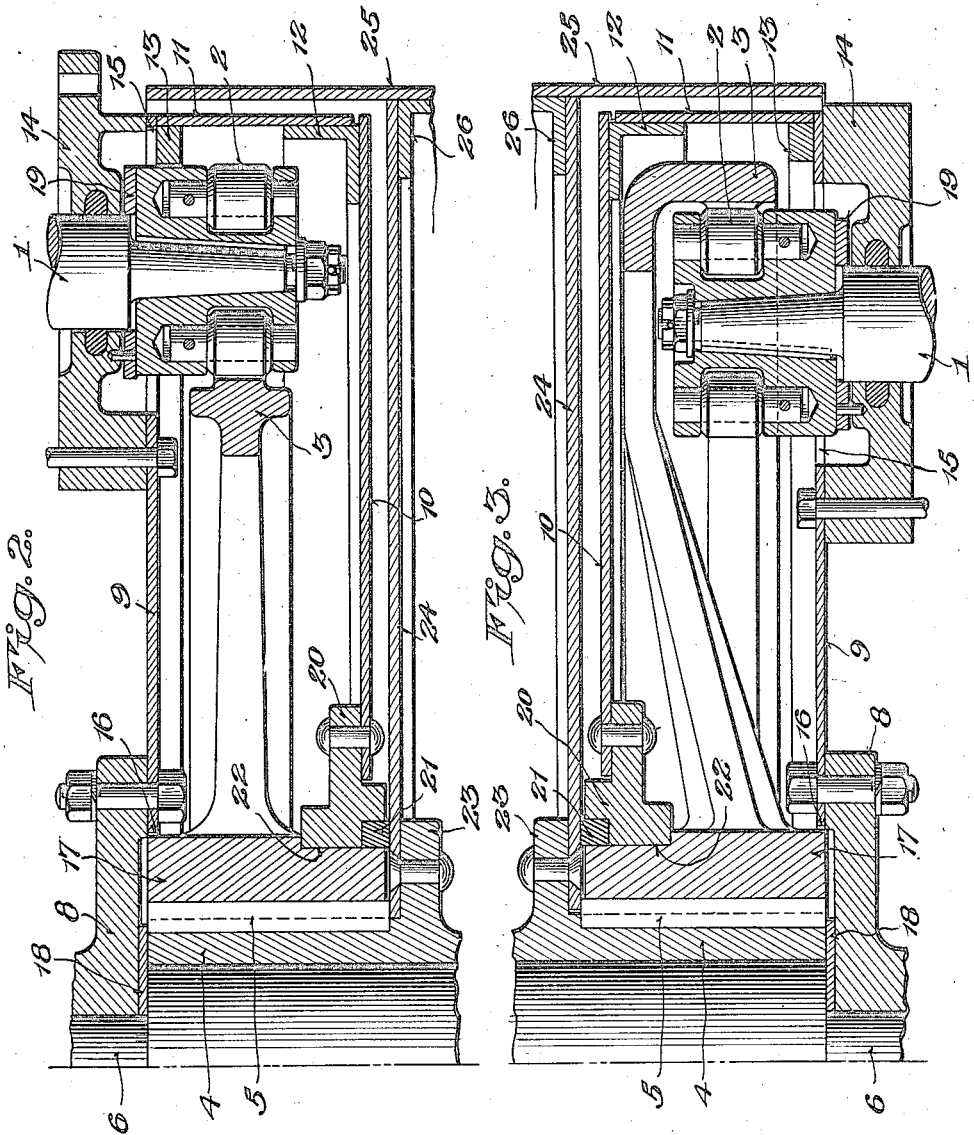

HUGH PARTRIDGE, OF JACKSONVILLE, FLORIDA, ASSIGNOR TO PARTRIDGE TRACTOR COMPANY, INC., OF JACKSONVILLE, FLORIDA, A CORPORATION OF FLORIDA.

TRACTION WHEEL.

1,427,167.    Specification of Letters Patent.    Patented Aug. 29, 1922.

Application filed February 7, 1920. Serial No. 356,870.

*To all whom it may concern:*

Be it known that I, HUGH PARTRIDGE, a citizen of the United States, residing at Jacksonville, in the county of Duval and State of Florida, have invented new and useful Improvements in Traction Wheels, of which the following is a specification.

This invention relates to improvements in traction wheels, proposing a construction which is especially applicable to farm tractors and which is of that general type wherein a toothed gear, operated by a pinion, is concentrically mounted on the hub of the wheel.

The objects of the invention are to provide a simply constructed traction wheel having the features pointed out wherein the associated gear elements may run in oil, and will be completely protected against dust and moisture.

With the above objects in view, the invention consists in certain features of structure, combination and relation which will be set forth as the description proceeds.

An embodiment of the invention is illustrated in the accompanying drawings, wherein:—

Figure 1 is a diametrical sectional view of a traction wheel embodying the invention.

Figures 2 and 3 are enlarged fragmentary sectional views showing traction wheels of the same structure but having differently related gear elements.

Figure 4 is an elevation showing the side plate of the enclosing guard or housing for the gear elements.

Similar characters of reference designate corresponding parts throughout the several views.

The construction presupposes the operation of a wheel by a jack shaft 1 which may be geared in suitable manner to the motor shaft, and which carries at its outer end a pinion 2 which meshes with a toothed gear wheel 3 concentrically mounted on the hub 4 of the traction wheel and made fast to said hub as by a key 5.

The axles or spindles 6 upon which the wheels operate are fitted in brackets 7 suitably secured to the frame of the tractor and project through the hub 4 of each wheel, suitable anti-friction elements being interposed between each spindle and its companion hub. The brackets 7 are provided adjacent the traction wheels with flanges 8 which serve for the attachment of a housing provided in accordance with the invention and by which the gear elements are enclosed and guarded. The housing is concentric with the traction wheel and in the construction preferred comprises an inner plate 9, an outer plate 10 and a peripheral ring 11 which extends between and connects the plates 9 and 10. The ring 11 and plate 10 are suitably secured to a ring 12 of angle-iron cross-section by which they are braced and connected. Adjacent the plate 9 the ring 11 is welded to an attachment ring 13 which is secured by bolts or otherwise to the plate 9; the latter, in turn, is secured to the flange 8 and also to the adjacent jack shaft bearing 14. The plate 9 is provided with a suitable opening 15 through which the pinion 2 projects and also with a central opening 16 to accommodate the hub 17 of the gear wheel 3. Suitable packing 18 is interposed between the flange 8 and the hub 4 and other suitable packing 19 is interposed between the bearing 14 and the plate 9. The plate 10 has a central opening to accommodate the hub 17 and the guard is completed by a ring 20 secured to said plate adjacent said opening and serving to brace the central portion of the plate; suitable packing 21 is, of course, interposed between the ring 20 and the hub 17 and said ring preferably cooperates with an annular shoulder 22 circumscribing said hub to prevent endwise displacement of the gear wheel 3 on or relatively to the hub 4. The latter projects outward beyond the enclosing guard and is formed with a circumscribing flange 23 to which is secured a plate or disk 24 forming the body of the wheel and preferably lying substantially in the central plane of the wheel. The rim 25 is attached to the disk 24 as by a ring 26 of angle-iron cross-section and is suitably braced relatively to the hub 4 by spokes 27. The plate 24 is preferably imperforate and the spokes 27 recede from said plate as they approach the hub. Consequently, the wheel proper has a triangular cross-section, one side constituted by the plate 24, thus providing a solid or imperforate face, and the other side constituted by the spokes 27, being of skeleton construction. By virtue of such structural characteristics, a body of cement may be incorporated with the wheel by casting the same within the rim 25 and upon the plate 24 and utilizing the spokes 27 as braces and retainers. In this way, the wheel may be made of any increased weight desirable or necessary in consideration of the particular environments of use. The rim preferably projects completely over the guard for the gear elements.

The wheel structures shown in Figures 2 and 3 are the same; these figures, however, illustrate the application of the features of the invention to internal and external gearing, respectively, both of which may be used in the same tractor in the manner shown, for example, by my co-pending application Serial No. 360,122, filed February 20, 1920.

Having fully described my invention, I claim:—

1. The combination with a traction wheel having a hub and a relatively wide rim, a toothed gear wheel keyed to the hub and a pinion meshing with said gear wheel, of a guard concentric to said traction wheel and arranged wholly within the space bounded by the inner surface of the rim of the traction wheel and the planes of the opposite edges of said rim, said guard enclosing said gear wheel and pinion and comprising peripherally connected inner and outer plates, the inner plate having openings to accommodate said hub and pinion and the outer plate having an opening to accommodate said hub.

2. The combination with a traction wheel having a hub and a relatively wide rim, a toothed gear wheel, keyed to the hub and a rim and a pinion meshing with said gear wheel, of a guard concentric to said traction wheel and arranged wholly within the space bounded by the inner surface of the rim of the traction wheel and the planes of the opposite edges of said rim, said guard enclosing said gear wheel and pinion and comprising peripherally connected inner and outer plates, the inner plate having openings to accommodate said hub and pinion and the outer plate having an opening to accommodate said hub, and supporting means to which the inner plate is connected adjacent said openings.

3. The combination with a traction wheel having a hub and a relatively wide rim, a toothed gear wheel, having a hub keyed to the traction-wheel-hub and a rim and a pinion meshing with said gear wheel, of a guard concentric to said traction wheel and arranged wholly within the space bounded by the inner surface of the rim of the traction wheel and the planes of the opposite edges of said rim, said guard enclosing said gear wheel and pinion and comprising peripherally connected inner and outer plates, the inner plate having openings to accommodate said traction-wheel-hub and said pinion and the outer plate having an opening to accommodate said traction-wheel-hub, the hub of the gear wheel having a circumscribing shoulder and the outer plate having means engaging said shoulder.

In testimony whereof I have hereunto set my hand in presence of two subscribing witnesses.

HUGH PARTRIDGE.

Witnesses:
BERTHA E. HARD,
PAULINE J. CAUTHEN.